United States Patent
AlDossary

(12) 
(10) Patent No.: US 11,111,906 B1
(45) Date of Patent: Sep. 7, 2021

(54) ONSHORE EQUIPPED OCEAN THERMAL AND HYDRAULIC ENERGY CONVERSION SYSTEM AND METHOD

(71) Applicant: Saudi Arabian Oil Company, Dhahran (SA)

(72) Inventor: Abdulaziz Mohammed AlDossary, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 16/794,939

(22) Filed: Feb. 19, 2020

(51) Int. Cl.
*F03G 7/05* (2006.01)
*F01D 15/10* (2006.01)

(52) U.S. Cl.
CPC ............... *F03G 7/05* (2013.01); *F01D 15/10* (2013.01)

(58) Field of Classification Search
CPC .................................. F03G 7/05; F01D 15/10
USPC ........................................................ 60/641.7
See application file for complete search history.

(56) References Cited

U.S. PATENT DOCUMENTS

| | | | |
|---|---|---|---|
| 3,312,054 A | 4/1967 | Anderson et al. | |
| 4,050,252 A * | 9/1977 | Nakanishi | F01K 23/04 60/641.6 |
| 4,430,861 A | 2/1984 | Avery | |
| 5,582,691 A | 12/1996 | Flynn et al. | |
| 7,178,337 B2 | 2/2007 | Pflanz | |
| 2010/0300095 A1 | 12/2010 | Sakurai | |
| 2013/0146437 A1 * | 6/2013 | Maurer | F17D 1/00 202/185.1 |
| 2014/0096520 A1 * | 4/2014 | Paya Diaz | F01K 11/02 60/641.7 |
| 2016/0040560 A1 * | 2/2016 | Hariri | F03B 13/00 60/671 |

FOREIGN PATENT DOCUMENTS

| | | |
|---|---|---|
| JP | 59046375 A | 3/1984 |
| JP | 63150474 A | 6/1988 |
| WO | 96/41079 | 12/1996 |

OTHER PUBLICATIONS

Masutani, S.M., Ocean Thermal Energy Conversion (OTEC) 2001, http:www.curry.eas.gatech.edu/Courses/6140/ency/Chapter2/Ency_Oceans/OTEC.pdf.
Woodford, C., OTEC (ocean thermal energy conversion), https://www.explainthatstuff/how-otec-works.html, Dec. 16, 2018.
International Search Report and Written Opinion of PCT Application No. PCT/US2021/070169, dated May 27, 2021: pp. 1-11.

* cited by examiner

*Primary Examiner* — Hoang M Nguyen
(74) *Attorney, Agent, or Firm* — Bracewell LLP; Constance G. Rhebergen; Douglas W. Rommelmann

(57) ABSTRACT

The ocean thermal and hydraulic energy conversion system includes a closed loop assembly comprising a pipeline filled with a working fluid, a pump and a turbine. The system includes a first supply line to transport warm water to an evaporator and then to a junction, and a second supply line to transport cold water to a condenser and then to the junction. The evaporator evaporates the working fluid from a liquid into a vapor using the warm water and the vapor powers the turbine. A generator is connected to the turbine and generates electricity by the powered turbine. The condenser condenses the working fluid vapor to a liquid using the cold water. A hydraulic converter receives the warm and cold water from the junction and converts the hydraulic energy into electricity.

17 Claims, 2 Drawing Sheets

ONSHORE EQUIPPED OCEAN THERMAL AND HYDRAULIC ENERGY CONVERSION SYSTEM AND METHOD

CROSS-REFERENCE TO RELATED APPLICATIONS

Not applicable.

BACKGROUND OF THE INVENTION

1. Field of the Invention

The present invention relates generally to ocean thermal energy conversion systems, and more particularly to ocean thermal and hydraulic energy conversion systems of the "closed cycle" type.

2. Description of the Related Art

Many ocean thermal energy conversion (OTEC) systems have been proposed to utilize the thermal qualities of ocean water to obtain useful electrical power. Conventional OTEC systems are arranged and designed to operate in response to the thermal differences existing between high temperature or warm surface water and low temperature or cold deep water. It is to be understood that references to "ocean" is not intended to be limiting to the invention. The OTEC systems typically require a body of water in which there exists a large temperature differential between the surface or near surface water and the bottom or lower depth water. Thus, suitable bodies of water are not limited to oceans, but may also include seas, lakes and other water bodies. The OTEC systems are generally classified as "closed cycle" or "open cycle" systems.

The conventional "open cycle" OTEC system utilizes sea water and its steam as the working medium and generates electricity as a primary product and fresh water as a secondary product. High temperature or warm water is pumped from or near the surface of the ocean to a flash evaporator maintained at low pressure. The flash evaporator vaporizes the warm sea water. The vaporized sea water is input to drive a turbine or similar power generator to generate electricity and then proceeds to a condenser. Low temperature or cold ocean water is pumped into the condenser to condense the vaporized sea water which is then delivered back to the sea.

The conventional "closed cycle" OTEC system generates electricity and uses a working medium having a low boiling point, for example ammonia, cycled within a closed loop. Warm sea water passes through an evaporator and vaporizes the ammonia. The vaporized ammonia passes through a turbine or similar power generator to make electricity and then the lower pressure vapor proceeds to a condenser. Cold sea water flows through the condenser to condense and liquefy the ammonia. The liquid ammonia is pumped on to the evaporator to repeat the cycle. The warm and cold sea water is returned to the sea.

Hybrid systems have also been proposed which utilize features of the "open cycle" and "closed cycle" systems.

It is desirable to have a "closed cycle" OTEC system that maximizes the energy produced by both thermal and hydraulic energy conversion. It is also desirable to have an onshore "closed cycle" OTEC system with hydraulic energy conversion that is efficient and sustainable.

SUMMARY OF THE INVENTION

The present invention is drawn to an ocean thermal and hydraulic energy conversion system which derives power from the thermal difference between surface and subsurface ocean waters and from the hydraulic energy of the water used in the system.

An embodiment of the ocean thermal and hydraulic energy conversion system includes a closed loop assembly comprising a first pipeline filled with a working fluid, a working fluid pressurizer and a first turbine. The system includes a first water supply line adapted to transport high temperature water to a first heat exchanger and then to a water junction, and a second water supply line adapted to transport low temperature water to a second heat exchanger and then to the water junction. The first heat exchanger is adapted to evaporate the working fluid from a working fluid liquid into a working fluid vapor using the high temperature water and the working fluid vapor powers the first turbine. A first generator is connected to the first turbine and adapted to generate electricity by the powered first turbine. The second heat exchanger is adapted to condense the working fluid vapor to a working fluid liquid using the low temperature water. A hydraulic converter is adapted to receive the high and low temperature water from the water junction and convert the hydraulic energy into electricity.

Combining the pressurized water exiting the first heat exchanger with the pressurized water exiting the second heat exchanger and passing it through the hydraulic converter maximizes the energy conversion harvested which increases the energy, financial and sustainability aspects of the overall system.

BRIEF DESCRIPTION OF THE SEVERAL VIEWS OF THE DRAWINGS

The invention is better understood by reading the detailed description of embodiments which follows and by examining the accompanying drawings, in which.

DESCRIPTION OF THE PREFERRED EMBODIMENTS

Figure 1:
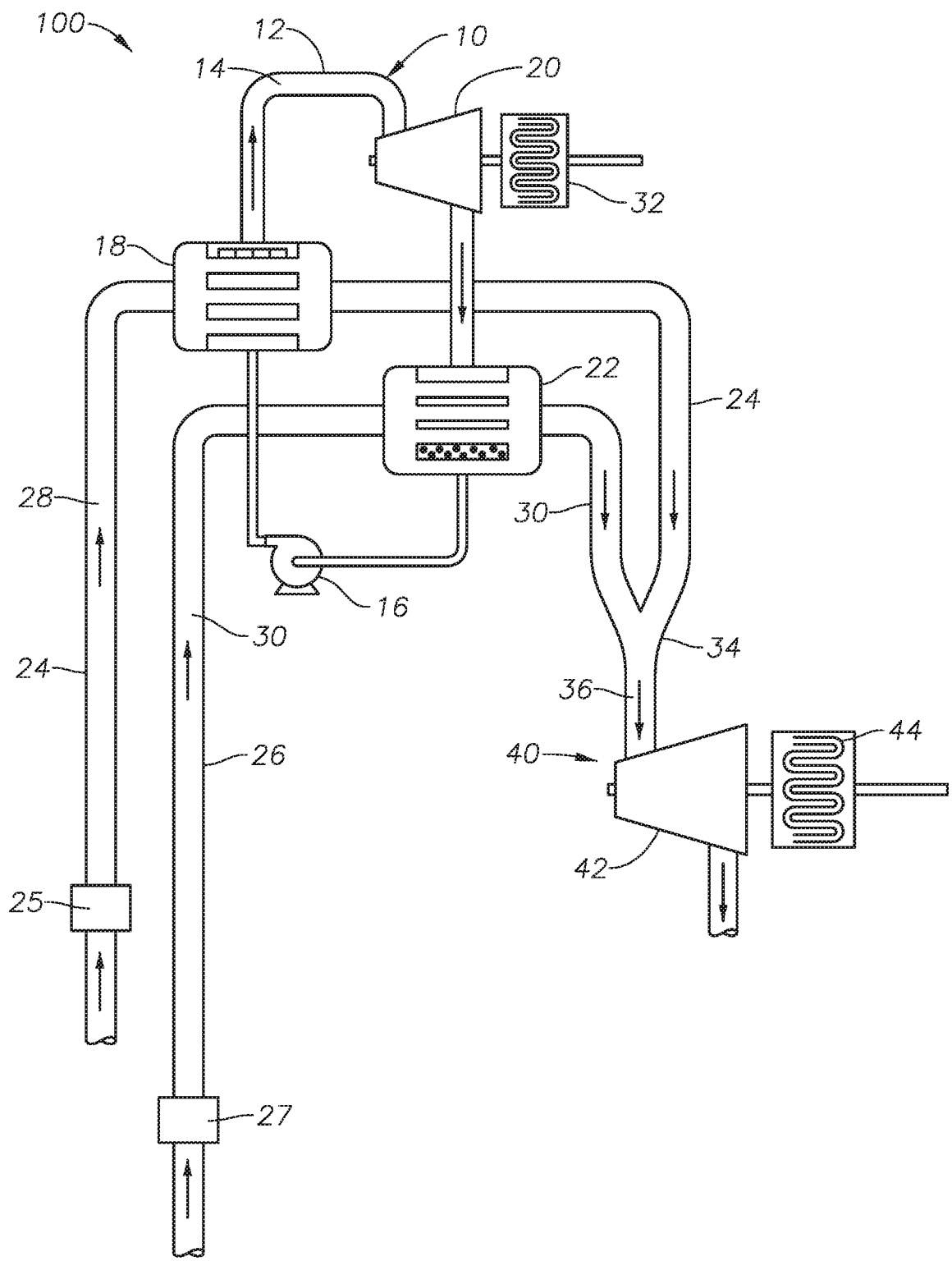
FIG. 1 is a schematic diagram of a preferred embodiment of the ocean thermal and hydraulic energy conversion system.

A detailed description of the ocean thermal and hydraulic energy conversion system according to an embodiment of the present invention, generally referenced as numeral 100, will now be described with reference to the drawings.

The energy conversion system 100 includes a closed loop assembly 10 comprising a first pipeline 12 filled with a working fluid 14 having a low boiling point. The working fluid 14 always remains in the closed loop assembly 10 and cycles around the closed loop assembly 10 again and again as explained in greater detail below. Although not intended to be limiting, one preferred working fluid 14 is ammonia which has a very low boiling point of 28° F. (−33° C.). The closed loop assembly 10 includes a working fluid pressurizer 16, preferably a liquid pump, for pumping the working fluid 14 as a liquid and a first turbine 20.

The working fluid 14 in the closed loop assembly 10 passes through the liquid pump 16, a first heat exchanger 18, the first turbine 20, and a second heat exchanger 22 during each cycle. As shown in FIG. 1, the first heat exchanger 18 is downstream of the liquid pump 16, the first turbine 20 is downstream of the first heat exchanger 18, and the second heat exchanger 22 is downstream of the first turbine 20.

The energy conversion system 100 includes first and second water supply lines 24 and 26, respectively. The first water supply line 24 contains warm or high temperature water 28 from or near the surface of the ocean pumped via a first pump 25. The second water supply line 26 contains cold or low temperature water 30 from the depths of the ocean pumped via a second pump 27.

The warm, high temperature water 28 in the first water supply line 24 is pumped in the first heat exchanger 18. The warm water 28 and the working fluid 14 (i.e., ammonia) flow past one another in the first heat exchanger 18, preferably an evaporator, so that the warm water 28 gives up some of its energy to the working fluid 14, making the working fluid boil and vaporize. The warm water 28 in the first water supply line 24, after passing through the evaporator 18, is slightly cooled.

Upon exiting the evaporator 18, the vaporized ammonia 14 flows through the first turbine 20 which is connected to a first generator 32 in order to generate electricity by conventional techniques. The vaporized ammonia 14 flows through the first turbine 20, making it spin. The first turbine 20 spins a first generator 32, converting the mechanical movement into electrical energy.

Having left the first turbine 20, the vaporized ammonia 14 has given up much of its energy, but needs to be cooled fully so that it will be able to pick up as much heat the next cycle. The ammonia 14 flows downstream in the closed loop assembly 10 to the second heat exchanger 22, preferably a condenser. The cold, low temperature water 30 in the second water supply line 26 is pumped in the condenser 22. The cold water 30 and ammonia 14 meet in the condenser 22, which cools the ammonia 14 back down to its original temperature, making it ready to pass around the cycle again. The cold water 30 in the second water supply line 26 is slightly warmer after passing through the condenser 22.

Additionally, to maximize the energy capturing from the ocean, a hydraulic converter 40 is used to convert hydraulic energy to generate additional mechanical energy to electrical energy in the following manner. As shown in FIG. 1, the warm water 28 in the first water supply line 24, after passing through the evaporator 18, is piped to a downstream location or junction 34 where the warm water 28 joins the cold water 30 from the second water supply line 26, after the cold water 30 has passed through the condenser 22. The combined warm water 28 and cold water 30, referred to as combined water 36, is passed through the hydraulic converter 40.

Figure 2:
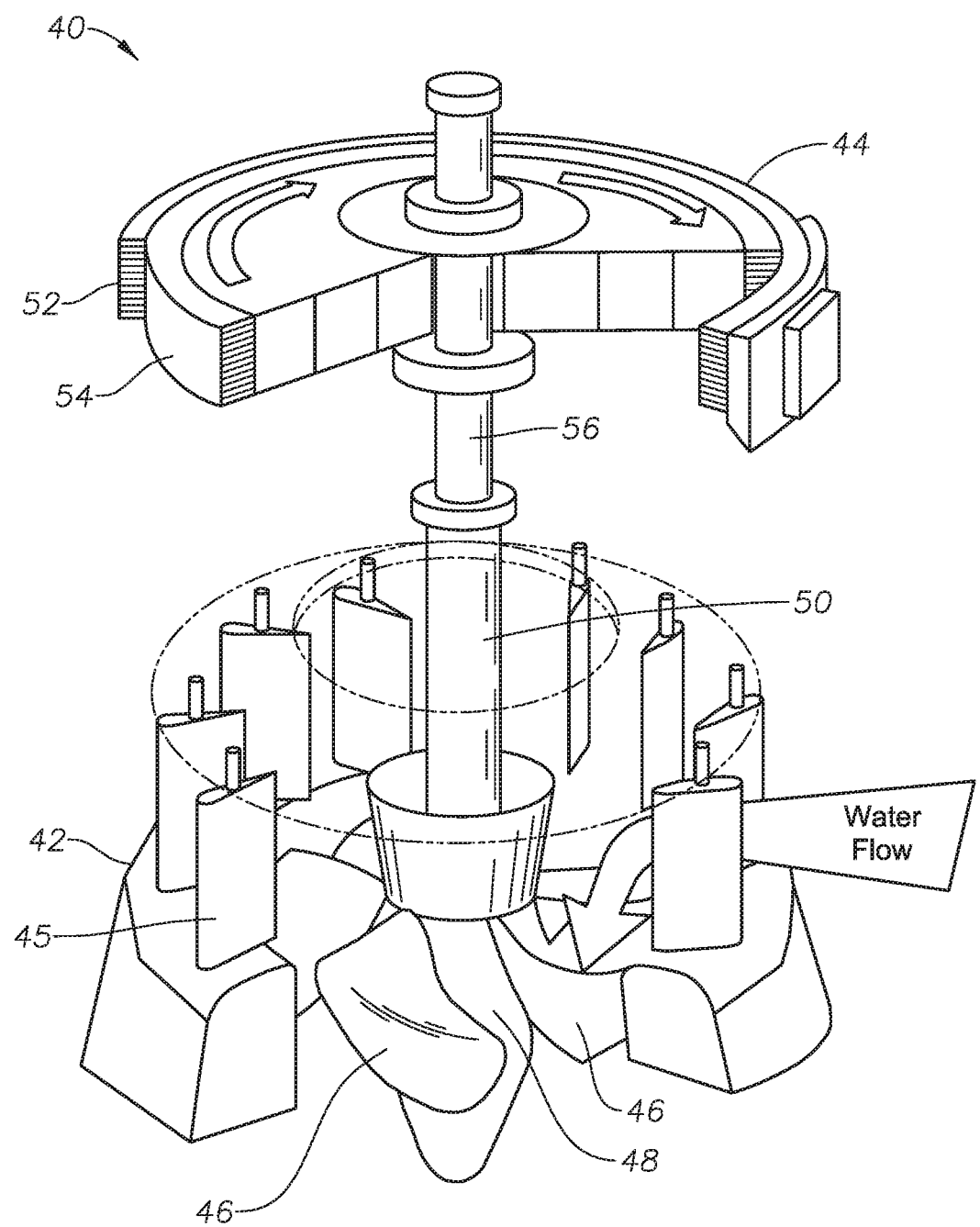
FIG. 2 illustrates a representative hydraulic generator stationed at the water discharge of the system.

FIG. 2 illustrates a representative hydraulic converter 40 comprising a hydraulic or water turbine 42 and a generator 44. As is well known and understood in the art, the hydraulic turbine 42 transforms the kinetic and potential energy of the combined water 36 into useful work and the generator 44 converts the work into electricity. Referring to FIG. 2, the hydraulic turbine 42 preferably includes a plurality of inlet guide vanes 45, a plurality of blades 46 attached to a runner 48 and the runner 48 is connected to a turbine shaft 50. The generator 44 includes a stator 52 and a rotor 54 attached to a generator shaft 56. The turbine shaft 50 is coupled to the generator shaft 52.

As the moving combined water strikes the turbine blades 46, it rotates the turbine runner 48, converting the energy of the moving combined water into rotational energy. With the rotation of the runner 48 and turbine shaft 50, the generator shaft 56 also rotates, converting the mechanical energy of the runner 48 into electrical energy.

Combining the pressurized warm water 28 exiting the first heat exchanger/evaporator 18 with the pressurized cold water 30 exiting the second heat exchanger/condenser 22 and passing pressurized combined water 36 through the hydraulic converter 40 maximizes the energy conversion harvested which increases the energy, financial and sustainability aspects of the overall system. Thus, the hydraulic converter 40 on the discharge outlet for the combined water 36 generates additional mechanical energy that can be stored as well as electrical power.

After the combined water 36 passes through the hydraulic converter 40 it can be returned back to the ocean.

It is to be understood that the junction 34 may be upstream of the hydraulic converter 40 or at the hydraulic converter 40, as for example at or in the hydraulic turbine 42.

The energy conversion system 100 of the preferred embodiment of the present invention maximizes the energy produced by both thermal and hydraulic energy conversion. The vaporized ammonia 14 passing through the closed loop assembly 10 utilizes the thermal energy from the ocean to convert mechanical movement into electrical energy that may be stored and used to lower fuel consumption for electricity for nearby facilities or tankers. The hydraulic converter 40 utilizes the same ocean water to generate yet additional electricity prior to its return to the ocean.

The foregoing disclosure and description of the invention are illustrative and explanatory thereof, and various changes in the size, shape and materials, as well as in the details of the illustrated construction, may be made without departing from the spirit of the invention. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

I claim:

1. An ocean thermal and hydraulic energy conversion system comprising:
  a closed loop assembly comprising a first pipeline filled with a working fluid, a working fluid pressurizer and a first turbine;
  a first heat exchanger;
  a water junction;
  a first water supply line adapted to transport high temperature water to the first heat exchanger and then to the water junction,
  wherein the first heat exchanger is adapted to evaporate the working fluid from a working fluid liquid into a working fluid vapor using the high temperature water, and the working fluid vapor powers the first turbine;
  a first generator connected to the first turbine and adapted to generate electricity by the powered first turbine;
  a second heat exchanger;
  a second water supply line adapted to transport low temperature water to the second heat exchanger and then to the water junction,
  wherein the second heat exchanger is adapted to condense the working fluid vapor to a working fluid liquid using the low temperature water;

a hydraulic converter adapted to receive the high and low temperature water from the water junction and convert the hydraulic energy into electricity.

2. The energy conversion system of claim 1, wherein the working fluid pressurizer is a liquid pump.

3. The energy conversion system of claim 1, wherein the first heat exchanger is an evaporator.

4. The energy conversion system of claim 1, wherein the second heat exchanger is a condenser.

5. The energy conversion system of claim 1, wherein the hydraulic converter is a hydraulic turbine and second generator.

6. The energy conversion system of claim 1, wherein the working fluid has a low boiling point.

7. The energy conversion system of claim 6, wherein the working fluid is ammonia.

8. The energy conversion system of claim 1, further comprising:
a first water pump connected to the first water supply line adapted to pump high temperature water under pressure through the first water supply line; and
a second water pump connected to the second water supply line adapted to pump low temperature water under pressure through the second water supply line.

9. The energy conversion system of claim 1, wherein the second heat exchanger is adapted to condense the working fluid vapor that exits the first turbine.

10. An ocean thermal and hydraulic energy conversion system comprising:
a closed loop assembly comprising a first pipeline filled with a working fluid, a pump and a first turbine;
an evaporator;
a water junction;
a first water supply line adapted to transport high temperature water to the evaporator and then to the water junction,
wherein the evaporator is adapted to evaporate the working fluid from a working fluid liquid into a working fluid vapor using the high temperature water, and the working fluid vapor powers the first turbine;
a first generator connected to the first turbine and adapted to generate electricity by the powered first turbine;
a condenser;
a second water supply line adapted to transport low temperature water to the condenser and then to the water junction,
wherein the condenser is adapted to condense the working fluid vapor exiting the first turbine to a working fluid liquid using the low temperature water; and
a hydraulic converter adapted to receive the high and low temperature water from the water junction and convert the hydraulic energy into electricity.

11. The energy conversion system of claim 10, wherein the hydraulic converter is a hydraulic turbine and second generator.

12. The energy conversion system of claim 10, wherein the working fluid has a low boiling point.

13. The energy conversion system of claim 12, wherein the working fluid is ammonia.

14. The energy conversion system of claim 10, further comprising:
a first water pump connected to the first water supply line adapted to pump high temperature water under pressure through the first water supply line; and
a second water pump connected to the second water supply line adapted to pump low temperature water under pressure through the second water supply line.

15. A method for maximizing the energy conversion of an ocean thermal and hydraulic energy conversion system comprising the steps of:
providing a closed loop assembly comprising a pipeline filled with a working fluid, a pump and a first turbine;
pumping warm water from at or near the upper surface of the ocean in a first supply line to an evaporator and then to a junction;
evaporating the working fluid from a liquid into a vapor using the warm water via an evaporator;
powering the first turbine with the working fluid vapor;
providing a first generator connected to the first turbine and the generator generating electricity by the powered turbine;
pumping cold water from a lower portion of the ocean in a second supply line to a condenser and then to the junction;
condensing the working fluid vapor exiting the first turbine to a liquid using the cold water via the condenser; and
combining the warm and cold water at the junction and converting the hydraulic energy of the combined warm and cold water into electricity via a hydraulic converter.

16. The method of claim 15, wherein the hydraulic converter is a hydraulic turbine and second generator.

17. The method of claim 16, further comprising the step of returning the combined warm and cold water to the ocean after powering the hydraulic turbine.

* * * * *